May 26, 1959

E. A. WILCKENS 2,887,973

CAP ASSEMBLING APPARATUS

Filed Aug. 9, 1955

INVENTOR
EIBE A. WILCKENS

BY
Cushman, Darby & Cushman
ATTORNEYS

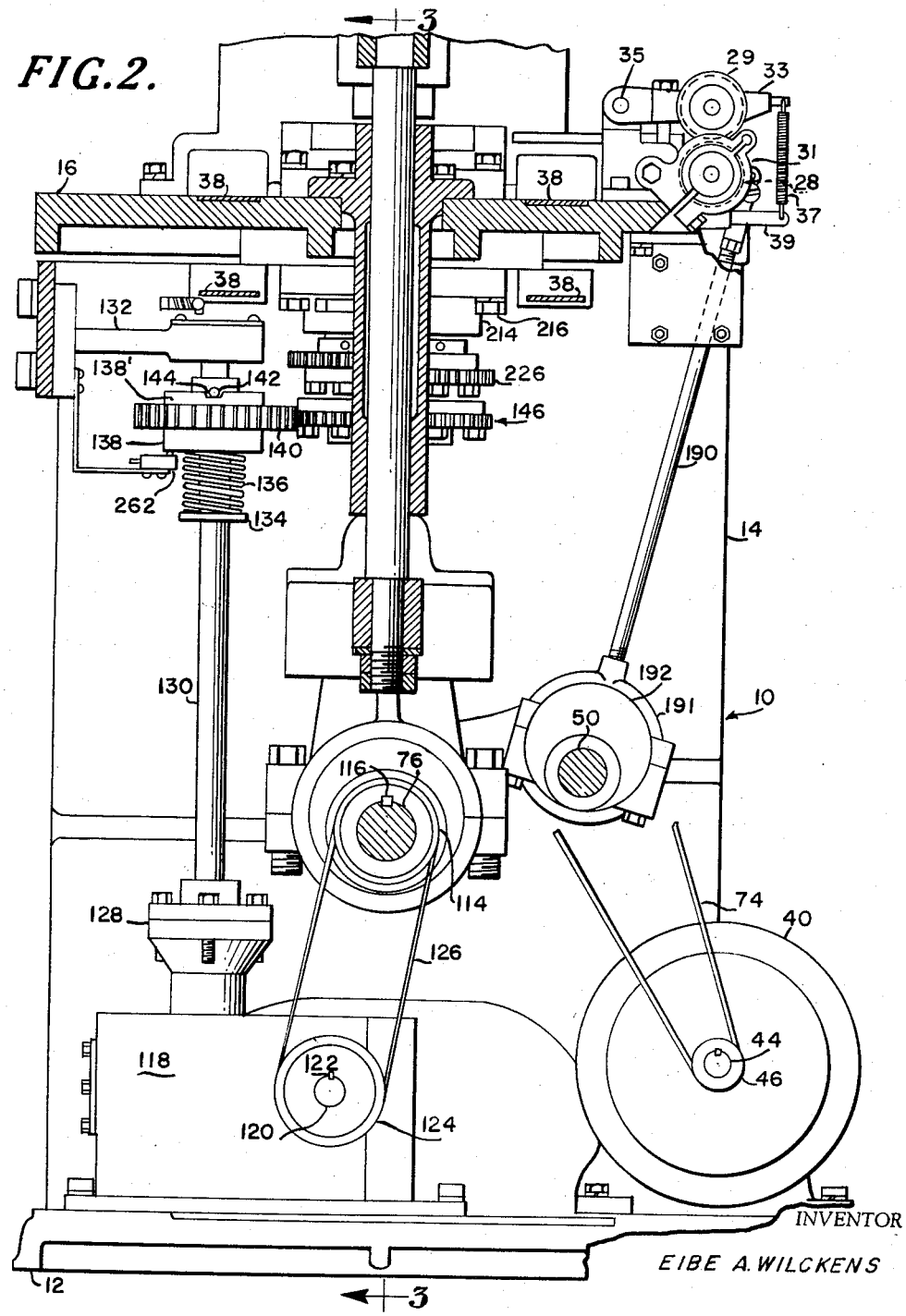

May 26, 1959  E. A. WILCKENS  2,887,973
CAP ASSEMBLING APPARATUS
Filed Aug. 9, 1955  5 Sheets-Sheet 4
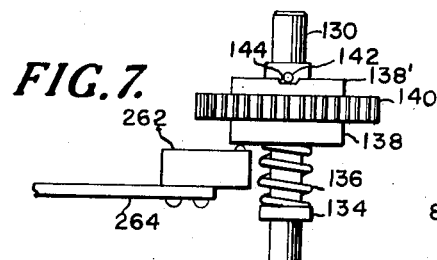
FIG. 7.
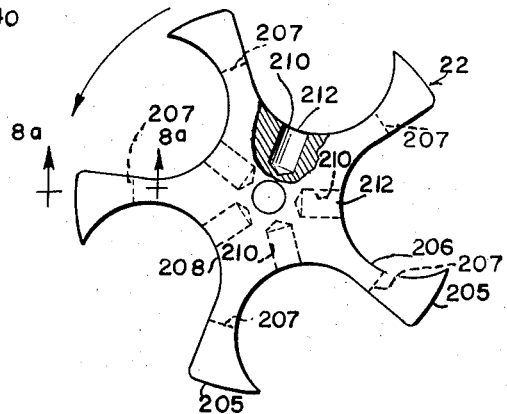
FIG. 8.
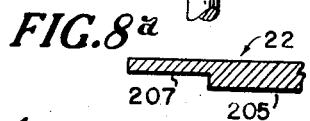
FIG. 8ª
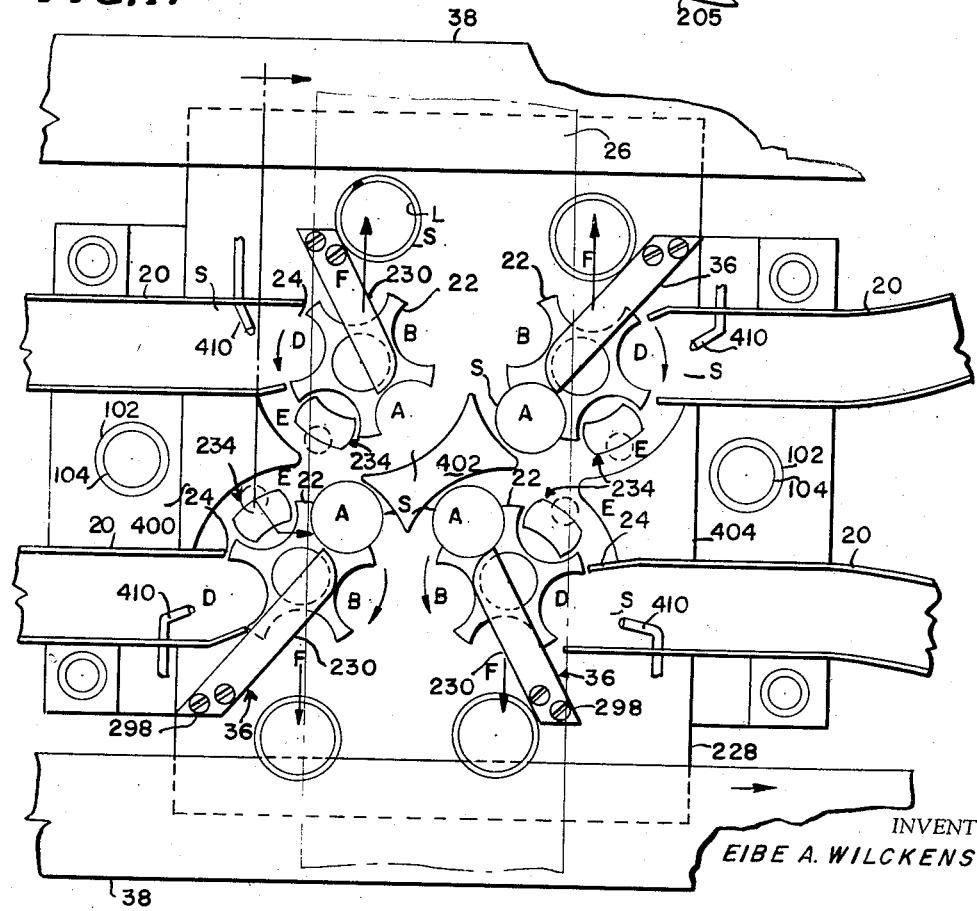
FIG. 4.
INVENTOR
EIBE A. WILCKENS
BY Cushman, Darby & Cushman
ATTORNEYS May 26, 1959
E. A. WILCKENS
2,887,973
CAP ASSEMBLING APPARATUS
Filed Aug. 9, 1955
5 Sheets-Sheet 5
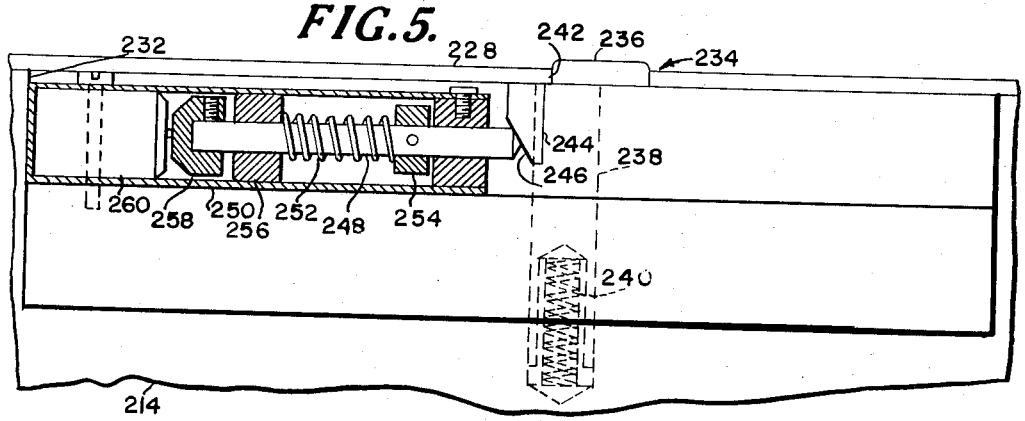
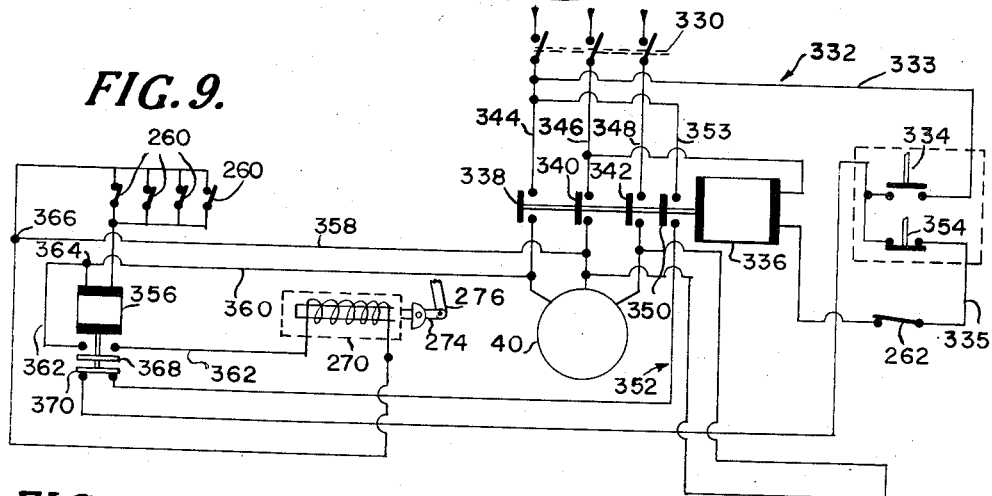
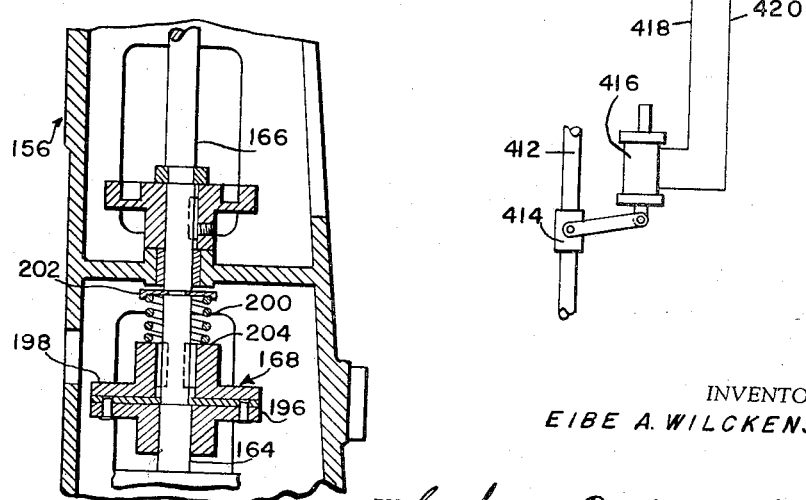
INVENTOR
EIBE A. WILCKENS
BY Cushman, Darby & Cushman
ATTORNEYS United States Patent Office 2,887,973
Patented May 26, 1959

2,887,973

CAP ASSEMBLING APPARATUS

Eibe A. Wilckens, Baltimore, Md., assignor to Crown Cork & Seal Company, Inc., Baltimore, Md., a corporation of New York Application August 9, 1955, Serial No. 527,353

10 Claims. (Cl. 113—80)

The present invention relates to a cap assembly apparatus and, more particularly, to apparatus for assembling a plurality of cap shells and liners simultaneously into a plurality of caps.

Heretofore, efforts have been made to assemble a pluralty of container caps simultaneously, but such apparatus for performing the same have proved cumbersome and insufficient, resulting in a waste of lining material from which the cap liners are continuously punched. Further, prior apparatus have lacked means for controlling the apparatus efficiently upon irregular operating conditions, such as interruption in the feeding of shells and/or jamming caused by feeding of an irregular or incorrectly positioned shell to the cap assembly apparatus.

An object of the present invention is to provide an apparatus which affords a continuous assembly of a plurality of caps and assures not only a better assembled cap, but increases the production of caps materially.

Another object of the present invention is to provide an apparatus for assembling simultaneously a plurality of container caps, the liners for the caps being simultaneously punched out of a strip of lining material.

Still another object of the present invention is the provision of an apparatus for assembling simultaneously a plurality of caps from shells and shell liners, the shell liners being punched out of a strip of material in such a manner as to obtain a maximum number of liners with a minimum of waste of lining material.

A further object of the present invention is to provide control means for a cap assembly apparatus, the control means preventing damage to the apparatus or waste of cap shells and liners when an emergency irregular operating condition occurs in the apparatus.

Still another object of the present invention is to provide an apparatus for simultaneously assembling a plurality of caps from cap parts, the apparatus having means for efficiently and quickly removing assembled caps therefrom.

A still further object of the present invention is the provision of a cap assembly apparatus having a unitary source of power for operating the various elements of the apparatus. Ancillary to the preceding object, the present invention contemplates the use of control means for the source of power, the control means being operative to stop the source of power and, thus, stop the feeding of all cap components and movable elements of the apparatus upon certain conditions occurring in the apparatus.

Another object of the present invention is the provision of a cap assembly apparatus for assembling caps from shells and liners punched from lining material, the movable parts of the apparatus being operated by a central source of power and the central source of power being stopped upon occurrence of certain conditions to thereby stop the movable parts. Further, the apparatus contemplates the provisions of additional means to instantly stop the feeding of lining material when the above-mentioned conditions occur.

These and other objects of the invention will appear more clearly from the following specification, claims and drawings in which:

Figure 2 is an enlarged front elevational view partly in cross section of the cap assembly apparatus looking from the left of Figure 1, parts of the apparatus having been omitted for purposes of clarity;

Figure 4 is a plan view of a fragmental portion of the cap assembly apparatus showing the relative position of the shell carrying dials to each other and to the shell feeding chutes and assembled cap discharge means;

Figure 5 is an enlarged side elevational view partly in cross section showing the details of the shell detector means for the cap assembly apparatus;

Figure 6 is an enlarged fragmental cross sectional view of the frictional drive for the shell hoppers of the cap assembly apparatus;

Figure 7 is an enlarged fragmental detailed view of the overload release device for the drive of the shell carrying dials of the cap assembly apparatus;

Figure 8 is an enlarged plan view partly in cross section of one of the shell carrying dials;

Figure 8a is a fragmentary view of a shell carrying dial taken on the line 8a—8a of Figure 8;

Figure 9 is a wiring diagram of the electrical control mechanism for the cap assembly apparatus.

*General construction and operation*

Figure 1:
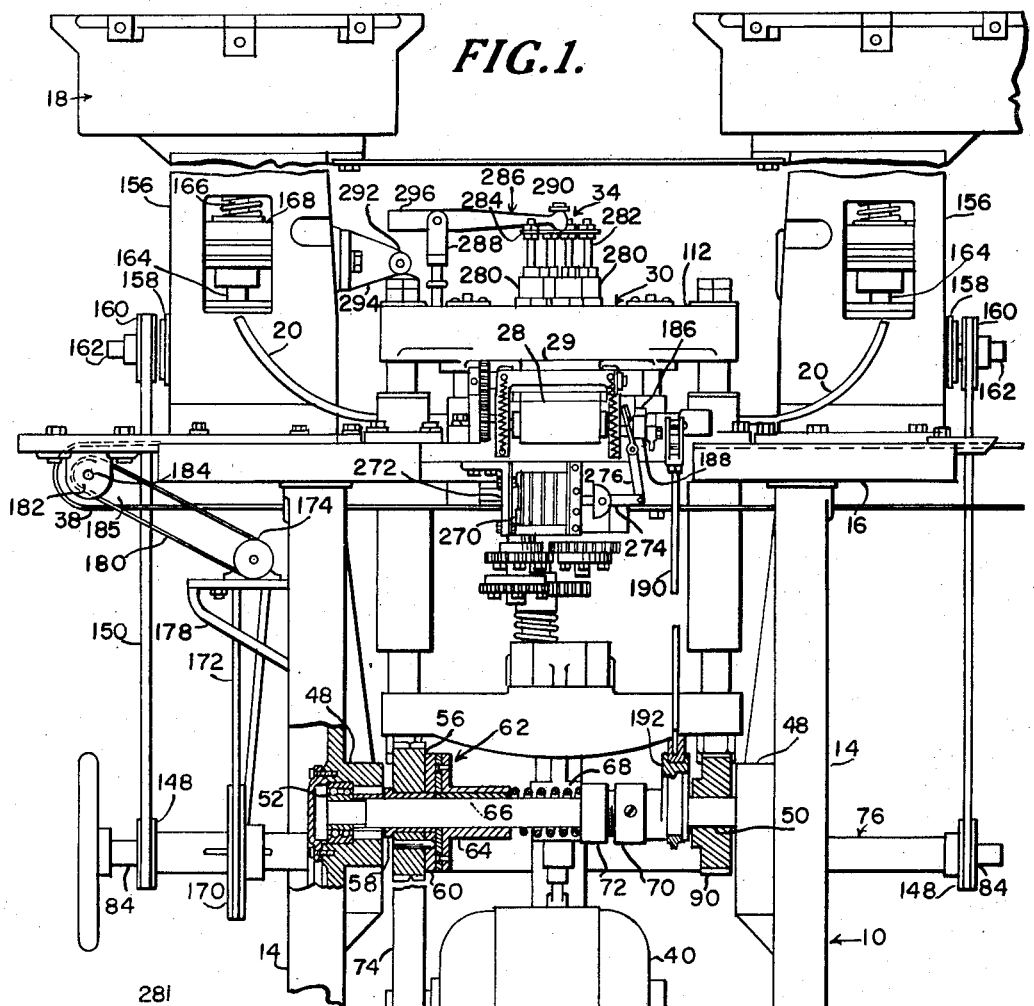
Figure 1 is a side elevational view partly in cross section of the cap assembly apparatus.

The cap assembly machine illustrated in the drawings is intended for assembling caps from a shell and a liner, the liner usually being formed of paper or the like punched from a roll of lining material. Although the machine illustrated is shown assembling screw caps, it is, of course, within the contemplation of the present invention that other types of caps such as lug caps, side seal caps or the like could be assembled. However, in the preferred form, the cap being assembled should be of the type wherein the shell is provided with a skirt and is made of metal, the liners being punched from a strip of lining material and inserted into the skirted shell.

Referring now to the drawings wherein like character or reference numerals represent like or similar parts, the cap assembly machine of the present invention is constructed and operated as generally described below. The machine includes a frame structure generally indicated by the numeral 10 having a base 12, a pair of horizontally spaced vertical legs or standards 14 extending upwardly from said base and a work table 16 supported on the upper end of legs 14. Legs or standards 14, one of which is shown in side elevation in Figure 2, are relatively wide and extend substantially across the base 12.

Metal cap shells S are delivered to the assembly mechanism of the apparatus from a suitable source including a pair of shell hoppers or shell feeding mechanisms 18, by a plurality of shell delivery chutes 20 simultaneously to a plurality of pocketed shell carrying dials 22 rotatably mounted on work table 16. Shell feeding mechanism or hoppers 18 are substantially similar to those disclosed in Eibe A. Wilckens and Harry Rau United States Patent No. 2,703,130, issued March 1, 1955, and application Serial No. 259,877, filed December 4, 1951, now Patent No. 2,804,837, with the exception that each of the hoppers is provided with two outlets for feeding shells S down two separate chutes 20 to pockets of the shell carrying dials 22. As best shown in Figure 4, each of the shell delivery chutes 20 is individually associated with one of the shell carrying dials 22.

After shells S have been delivered in an inverted position to a pocket in each of the shell carrying dials 22, as indicated at position D, the dials are rotated simultaneously to bring another empty pocket into registry with the outlets 24 of shell delivery chutes 20. Continued simultaneous step-by-step movement of shell carrying dials 22 brings the shell-filled pockets of the dials to a position A as illustrated in Figure 4.

When shell-filled pockets of the shell carrying dials 22 reach the position A, the dials are in an indexed position for inserting a liner L into shell S. Liners L are punched from a strip of lining material 26 fed over dials 22 as illustrated in Figure 4. The strip of lining material 26 is intermittently fed over dials 22 from a roll of lining material (not shown), the feed being operated in synchronism with the step-by-step movement of dials 22. A plurality of liners L corresponding in number to the number of dials is punched simultaneously out of the strip of lining material 26 by means of a punch mechanism generally indicated by the numeral 30. The liners L are knocked out of the liner die mechanism 32 by the liner knock-out mechanism generally indicated at 34.

After a shell in a pocket of each of the shell carrying dials 22 reaches position A (Figure 4) and has a liner inserted therein to form an assembled cap, dials 22 are again rotated to position B and the caps formed at A will begin to engage a cap discharge mechanism 36 where they are discharged out of the pockets of the dials onto a pair of take-off conveyors 38. Take-off conveyors 38 transfer or convey the assembled caps to suitable packaging machines or the like.

While the construction and operation of the cap assembling machine is broadly covered above, it will now be apparent that the machine continuously assembles four caps simultaneously, the shells S being continuously fed down the chutes 20 where they are picked up by empty pockets of shell carrying dials 22 and transferred in a step-by-step motion until indexed under the die mechanism 32 where liners L are punched out and inserted therein. Although dials 22 operate in step-by-step movement along with the feed of the strip of lining material 26 by a feed roller 28, the interval which the dials 22 and the lining material 26 are stationary is only long enough for a liner to be punched out and inserted into a shell filled pocket of the dials.

A more detailed description of the construction and operation of each of the devices outlined above will hereinafter follow.

*Drive mechanism*

As best shown in Figure 1, the central source of power for the cap assembly machine is an electric motor unit 40 bolted to the base 12 of frame structure 10 as indicated at 42. Motor unit 40 is provided with a drive shaft 44 on which is keyed a drive gear or sprocket 46.

Legs 14 are provided with oppositely disposed bosses or bearing houses 48 integrally cast therewith in which an intermediate drive shaft 50 is supported. As clearly shown in Figure 1, the ends of intermediate drive shaft 50 are supported in the bearings 52 housed in the bosses 48 on legs 14. A sleeve bearing 58, mounted on intermediate drive shaft 50, rotatably supports a sprocket or gear 56. A safety friction clutch, generally indicated by the numeral 62, provides a driving connection between sprocket 56 and intermediate drive shaft 50. Clutch 62 includes a drive element fixedly connected to and rotatable with sprocket 56 and a driven element 64 keyed to and rotatable with drive shaft 50 as indicated at 66. Driven element 64 is movable longitudinally of drive shaft 50 and is spring urged into frictional engagement with the drive element 60 by a coil spring 68, positioned between driven element 64 and a thrust collar 70 on drive shaft 50, thus, torque is transmitted from the sprocket 52 to the intermediate drive shaft 50. The amount of friction which driven element 64 engages drive element 60 can be varied by varying an adjustment nut 72 forming a part of thrust collar 70.

Torque from motor 40 is transmitted to the sprocket 56 by a gear or sprocket chain 74 and, as previously mentioned, this torque will be transmitted from the sprocket 56 to intermediate drive shaft 50 through the safety friction clutch 62.

Figure 3:
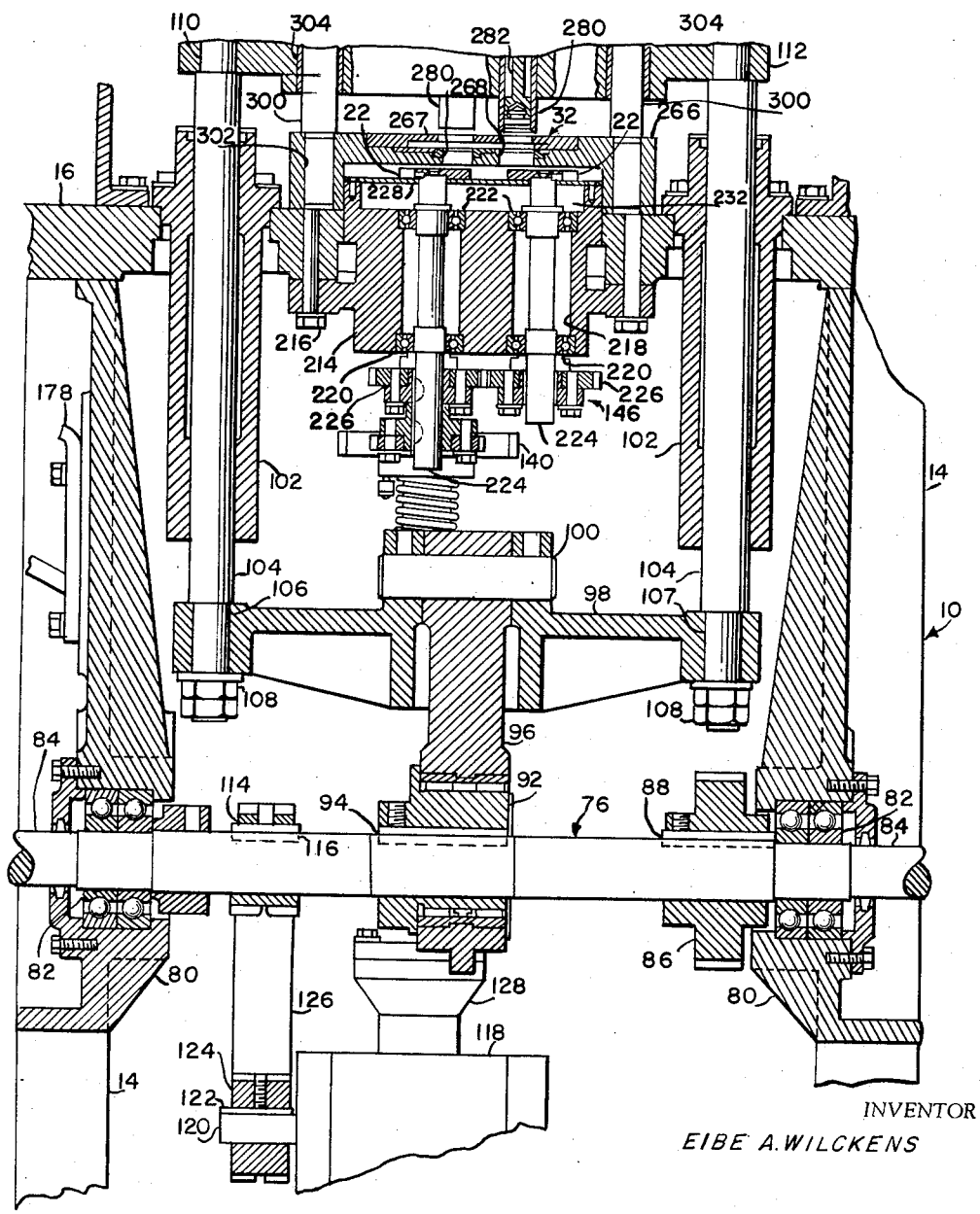
Figure 3 is a view of the cap assembly apparatus taken on the line 3—3 of Figure 2.

Referring now to Figures 1, 2 and 3, legs 14 of frame structure 10 also support a second or main drive shaft 76 which is slightly below and laterally displaced from intermediate drive shaft 50. As best shown in Figure 3, a second boss or housing 80 is provided on each of the legs 14 and supports bearings 82. The ends 84 of main drive shaft 76 extend through the bearings 82 so as to support other components of the drive mechanism as will be described in more detail later in the specification.

A gear 86 (Figure 3) is keyed to main drive shaft 76 as indicated at 88. Gear 86 is adapted to mesh with a gear 90 (Figure 1) keyed to the intermediate drive shaft 50 and, thus, torque of the intermediate drive shaft 50 is transferred to main drive shaft 76.

As best shown in Figure 3, an eccentric 92 is keyed to main drive shaft 76 as shown at 94. Eccentric 92 is adapted to receive the yoke of a punch operating connecting rod 96, the connecting rod 96 being given vertical movement by the rotation of eccentric 92. The upper end of connecting rod 96 is connected to a punch operating bar yoke 98 by a wrist pin 100. Mounted on the work table 16 and extending downwardly therefrom are a pair of tubular bearings or guide elements 102 which are adapted to receive and support for vertical movement with respect thereto a pair of punch operating bars 104. The lower end of punch operating bars 104 are reduced as indicated at 106 and extend through bores 107 in the punch operating bar yoke 98. The ends of bars 104 are threaded and adapted to receive the nuts 108 so as to rigidly connect them to punch operating bar yoke 98. Upper ends 110 of bars 104 are also reduced and are adapted to receive and support a punch holder member 112. As is now evident from the arrangement just described, rotation of main drive shaft 76 will cause the eccentric 92 to rotate, the connecting rod 96 transmitting vertical movement to the punch operating bar yoke 98 which in turn raises and lowers the punch holder 112. A more detailed description of the punches and the die mechanism will follow later in the specification.

A gear or sprocket 114 is keyed to the main drive shaft 76 as indicated at 116, Figures 1 and 2. Mounted on the base 12 adjacent motor unit 40 is an intermittent drive unit 118 having an input shaft 120. Keyed to shaft 120, as indicated at 122, is a gear or sprocket 124. An endless chain or sprocket drive 126 connects gear 114 with gear 124 and rotary movement of main drive shaft 76 is transferred to the intermittent drive unit 118. Unit 118 converts continuous rotary movement of its input shaft 120 into intermittent or step-by-step movement at its output shaft (not shown) which is coupled by a suitable coupling 128 to a vertical drive shaft 130 for the shell carrying dials 22. The upper end of shaft 130 is supported in a bearing bracket 132 mounted on the frame structure 10 in any suitable manner. Drive shaft 130 for shell carrying dials 22 is provided with a thrust collar 134 intermediate its ends, the thrust collar 134 supporting one end of a coil spring 136. The other end of coil spring 136 bears against a lower hub 138 of a gear 140 and resiliently urges the gear upward against a pin 142 extending through shaft 130. Pin 142 is received in a recess or V-shaped slot 144 on the upper hub 138' of gear 140 and provides a driving connection between gear 140 and the shaft 130. Gear 140 meshes with a gear train generally indicated at 146, the gear train providing dependent, but simultaneous, stepby-step rotation of each of the plurality of shell carrying dials 22. From the above detailed description of the drive for the shell carrying dials 22, it will now be evident that continuous rotary movement of main drive shaft 76 is converted into intermittent or step-by-step rotary movement through intermittent drive unit 118 to drive shaft 130. Drive shaft 130 in turn, through gear 140 and gear train 146, intermittently drives the shell carrying elements 22. A more detailed description of the gear train and the shell carrying dials 22 will appear later in the specification.

Mounted on each of the ends 84 of drive shaft 76 are pulleys 148 which are adapted to receive the pulley belts 150. Pulley belts 150 extend upwardly to the base of a pair of shell hopper support columns 156 mounted on the work table 16. A speed reducer unit 158 is mounted in the base of each of the vertical support columns 156 and is provided with a pulley 160 mounted on horizontally extending shaft 162. Pulley 160 receives the belt 150 and rotary movement is transferred from shaft 76 thereto. Within column 156, each of the speed reducer units 158 is provided with a vertical driven shaft 164 which is coupled to a drive shaft 166 by a friction clutch 168, Figure 6. The detailed construction of the hoppers 18 is disclosed in the previously mentioned Wilckens et al. United States Patent No. 2,703,130, issued March 1, 1955, and application Serial No. 259,877, filed December 4, 1951.

Assembled cap take-off conveyors 38 are driven from the main drive shaft 76 by means of a pulley 170 keyed thereto, the pulley being adapted to receive a pulley belt 172 which drives a pulley exchange unit 174 mounted on the bracket 178 extending from one of the legs 14. Pulley exchange unit 174 receives a second pulley belt 180 which in turn drives a pulley 182 connected to the drive shaft 184 of a drive roller 185 for conveyor belts 38.

The strip of lining material 26 is fed from a large roll of lining material supported on a stand (not shown) between feed roller 28 and a pressure roller 29. A hanger bracket 33, pivotally mounted on work table 16 as indicated at 35, supports the upper or pressure roller 29. Springs 37 connected between the outer ends of bracket 33 and lugs 39 on work table 16, urges roller 29 toward roller 28. Roller 29 is geared to roller 28 and is positively rotated thereby in step-by-step increments. Feed roller 28, which is supported on work table 16 adjacent the punch and die mechanism 30 by a suitable hanger bracket 31 (Figure 2), is provided with a ratchet wheel 186, the ratchet wheel adapted to be moved in step-by-step movement by a pawl 188 (Figure 1). Pawl 188 is suitably connected to one end of a connecting rod 190, the other end of the rod having a bearing fitting 191 rotatably supported on an eccentric 192 keyed to intermediate drive shaft 50. Rotation of the intermediate drive shaft causes connecting rod 190 to reciprocate back and forth moving the pawl 188 into and out of engagement with the teeth of ratchet wheel 186 thereby giving intermittent rotary movement to the feed roller 28 and pressure roller 29 and, thus, intermittently feeding the strip of lining material 26 therebetween over the shell carrying dials 22 to a position where liners are punched therefrom and inserted into shell-filled pockets of the dials.

Although the drive for the punch operating mechanism, shell carrying dials, and lining material feed have been separately described, it will be appreciated that the drives of each unit must operate in timed relationship with each other. In other words, when the shell carrying dials are being moved from one position to another position for indexing under the punch mechanism, the punch mechanism will be in the upper portion of its vertical stroke, while the strip of lining material will simultaneously be fed by rollers 28 and 29 from the roll of material to a position for punching liners therefrom. When the punching mechanism is punching liners from the strip of lining material, the feed roller for the lining material will be stationary and the shell carrying dials will be stopped.

Shell feeding and delivering mechanism

Referring now to Figures 1, 4 and 6, the shell feeding and delivering mechanism to cap assembly mechanism of the machine includes, as previously mentioned, a pair of hoppers 18 mounted on spaced vertical support columns 156, the columns 156 housing the drive for the hoppers. Hoppers 18 are each provided with a rotating shell feeding drum of the type disclosed in the aforementioned United States Patent No. 2,703,130, issued March 1, 1955, and application Serial No. 259,877, filed December 4, 1951, the drum in the hoppers orienting the shells and feeding them to the outlet chutes 20. The hoppers 18 for the present invention each are provided with a pair of chutes 20 which extend downwardly therefrom and terminate horizontally adjacent the shell carrying dials 22 as disclosed in Figure 4. It will be noted that the delivery chutes 20 on the left of Figure 4 are fed into the shell carrying dials 22 in a parallel relationship from the hopper 18 on the left of Figure 1, whereas the delivery chutes 20 on the right of Figure 4 are fed into shell carrying dials 22 in a parallel relationship from the hopper 18 on the right of Figure 1. Since the shell carrying dials are mounted in a specific relationship to each other on work table 16, it will be necessary that one chute of each dial be slightly longer than the other chute as shown in the arrangement of Figure 4. Shells are fed down the chutes in such a manner that they are presented at the chute outlets 24 in an inverted position so that they are received by the pockets of the dials in an inverted position, enabling liners to be inserted therein from above.

Shells are delivered to hoppers 18 so as to keep them substantially filled and, thus, the hoppers will continuously deliver shells down the chutes 20 where they are received in empty pockets of shell carrying dials 22. Although the shell feeding drums (not shown) in the shell hoppers 18 are continuously rotating at a relatively slow speed, shells will back up in the chutes 20 and will be removed therefrom only when an empty pocket of the dials 22 is in registry with the ends 24 of the chutes. As will be more apparent later in the specification, the dials 22 will simultaneously remove one shell from each of the four shell feeding chutes 20.

As shown in detail in Figure 6, the drive for the shell feeding drum in shell hoppers 18 is provided with the overload release friction clutch 168. The clutch 168 provides an overloading release in case of jamming of a shell feeding drum. More specifically, the driven shaft 164 is provided with a clutch element 196 rigidly mounted thereto. Clutch element 196 frictionally engages a clutch element 198 keyed to the drive shaft 166. Clutch element 198, which is movable longitudinally of shaft 164, is resiliently urged into engagement with element 196 by means of a coil spring 200 surrounding shaft 166 and bearing between a thrust collar 202 and a hub 204 of the element 198. In operation, should there be a jamming of the shell feeding drum in hopper 18, clutch 168 will slip, but at the same time there will be no shells fed to the particular chutes of that hopper and, consequently, the cap assembly apparatus will be stopped by a detector means associated with the shell carrying dials 22. A more detailed discussion of the detector means will follow later in the specification.

Shell carrying dials

Referring specifically to Figure 8, shell carrying dials 22 are provided with a plurality of radially extending fingers 205 defining pockets 206, the pockets being of size and shape adapted to receive a shell from the shell delivery chutes 20. Each dial 22 is provided with a hub 208, the hub having a radial bore 210 therein extending inwardly from the center of each of the pockets 206. Fixedly mounted in each of the bores 210 are magnets 212 for retaining a metal shell S when it is being carried by the dial. In other words, as dial 22 rotates there is a certain amount of centrifugal force which tends to throw the shell radially outwardly, but by having magnets 212 associated with each of the pockets of the dials, the shells are retained in position. As shown in Figure 4, guide blocks 400, 402 and 404 may be mounted on a shell slide plate 228 to further help in retaining shells in the pockets of dials 22 as the dials are rotated.

Referring now to Figure 3, work table 16 is provided with a bearing plate or housing 214 bolted thereto at 216. Bearing plate 214 is provided with a plurality of vertical bores 218 therethrough, each of the bores supporting lower and upper bearings 220 and 222 respectively, which house drive shafts 224. One of the dials 22 is mounted on the end of each of the drive shafts 224, while the lower end of each of the drive shafts is provided with a gear 226 meshing with each other, the gears 226 forming the previously mentioned gear train 146.

As best shown in Figure 3, dials 22 are mounted on top of a shell slide plate 228, the purpose of the plate being described more fully later in the specification. The position of each dial 22 with respect to each other is shown in Figure 4. As shown, a pair of dials 22 are mounted in a row in axial alignment with each other, whereas a second pair of dials 22 is also mounted in a row in alignment with each other, the row of the second pair of dials being parallel to the row of the first pair of dials, but the dials of the second row being staggered with respect to the dials of the first pair. Consequently, the drive shafts for the individual dials 22 will assume a position relative to each other similar to the arrangements of the dials as disclosed in Figure 4.

As has been previously mentioned, dials 22 are simultaneously rotated in intermittent step-by-step movement by means of the intermittent drive unit 118 driven by the electric motor unit 40. As a pocket 206 of each dial comes into registry with the chute 20, it will receive a shell therefrom, the shell being inverted and slidable on the shell sliding plate 228. While a shell is being received in an empty pocket of each of the dials 22 at the position D, the shell of a previously filled pocket of each of the dials, as disclosed in Figure 4, will receive a liner L at position A. The die and punch mechanism for inserting liners to the shells at position A will be described in more detail later in the specification. Discharge mechanism 36, including deflectors 230 extending into the path of the assembled caps, will begin to engage the assembled caps at B and will overcome the magnetic holding force of magnets 212 and discharge the caps onto the oppositely disposed take-off conveyors 38.

Referring now to Figure 5, it will be noted that the bearing plate or housing 214 is provided with a space 232 immediately beneath the shell sliding plate 228. The space 232 houses the detector means for detecting the presence or absence of a shell in the pockets of the shell carrying dials 22. More specifically, each shell carrying dial, at a position E forward of the position A where the liners are inserted into the shells, is provided with detecting means 234 for determining the presence or absence of a shell in the pocket of each of the dials 22. Detecting means 234 includes a button 235 mounted on a plunger 238 and spring urged upwardly by a compression spring 240 mounted between the button plunger 238 and the bearing block 214. The button 234 extends through an aperture 242 in the shell sliding plate 228 and is adapted to extend upwardly and into the path of shells being carried by the shell carrying dials 22. A cam element 244 is mounted on the plunger 238 and has a camming surface 246 which is adapted to engage one end of a horizontally disposed plunger 248. Plunger 248 is mounted in a switch supporting sleeve 250 and is spring urged toward the camming surface 246 of cam element 244 by means of a spring 252 mounted between a thrust collar 254 on horizontally disposed plunger 248 and the bearing block 256 carried by the sleeve 250. The opposite end 258 of plunger 248 is adapted to engage a microswitch 260. Normally, micro-switch 260 is closed, however, when a shell is present in the dial, the shell will push the button 236 downwardly from its position shown in Figure 5, thus, causing camming element 244 to move the horizontally disposed plunger 248 to the left of Figure 5 opening microswitch 260. The ends of fingers 205 are notched on their underside as indicated at 207 so that they can clear button 236 when the button is in the raised position. In normal operation where shells are continuously fed to the shell feeding dials, the button 236 will be held in the down position, consequently, the switch 260 will remain open. However, upon the absence of a shell in a pocket of the dials 22, the button 236 will move upwardly, permitting plunger 248 to move to the right as shown in Figure 5, thus, closing micro-switch 260 to energize a control circuit to stop the cap assembly machine.

One detector mechanism, such as shown in Figure 5, is mounted in the space 232 of housing 214 and associated with each of the four dials 22 at the position E disclosed in Figure 4. Operation of any of the detector mechanisms 234 will cause the cap assembly apparatus to stop as will be described more fully later in the specification.

Referring now to Figure 7, a micro-switch 262 is mounted on a bracket 264 fixedly connected to the frame structure 10. Micro-switch 262 is positioned adjacent hub 138 of gear 140 and is adapted to be operated by hub 138 when an overload or jamming condition occurs in any one of the dials 22. As previously explained, if a jam occurs in any of the dials 22, the gear train 146 will be stopped as well as the drive gear 140. However, shaft 130 will continue to be intermittently rotated by the intermittent drive unit 118, the drive pin 142 on the shaft being cammed out of the V-slot 144 and causing the gear 140 to move vertically downwardly against the tension of spring 136. Movement of the gear 140 on its hub vertically downwardly will open the normally closed micro-switch 262 to stop the cap assembly apparatus as will be explained in more detail later in the specification.

*Liner feeding device*

Positioned above and spaced from shell sliding plate 228 is a die plate 266 fixedly supported on work table 16. Die plate 266 is provided with four apertures 268 therein which are arranged with respect to each other so as to be in alignment with the pockets of dials 22 when they reach the position A where liners are inserted into the shells. Mounted on die plate 266 is stripper plate 267 having apertures therein in alignment with the apertures 268. Stripper plate 267 aids in stripping the skeleton of the lining material from punches 280 after the liners have been punched therefrom.

As previously mentioned, lining material in the form of a strip 26 is fed over the die plate 266 from the roll of lining material by rollers 28 and 29. Since star wheels or dials 22 are arranged as disclosed in Figure 4 and the station for punching the liners provides for four liners to be simultaneously punched from the strip of lining material 26 at the position A, the strip of lining material 26 is of a width less than the diameter of four shells placed side by side. In other words, the step-by-step movement of the strip of lining material 26 as caused by the pawl 188 and ratchet wheel 186 after liners have been punched will be sufficient to move the strip transverse of the rows of dials 22 a distance substantially equal to the diameter of a shell or liner. By having the dials in adjacent rows staggered, the position where liners are punched from the strip of lining material will be such that liners for shells of one row of dials are punched in staggered relationship with liners for shells of the other row of dials. Maximum utilization of lining material from the strip of lining material results from this arrangement in that a subsequent movement of the strip of lining material transverse of the rows of dials a distance of the diameter of substantially one liner will position the lining material between the previously punched-out liners over openings 268 in the die plate 266.

Figure 10:
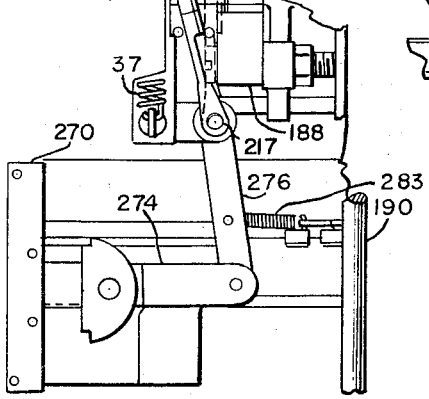
Figure 10 is an enlarged fragmentary elevational view of the pawl and ratchet mechanism for the lining material feed roller.

A solenoid 270 is fixedly mounted to work table 16 by means of a bracket 272. Solenoid 270 has an operating plunger 274 extending therefrom and connected to a pivoted lever arm 276. Referring now to Figure 10, it will be noted that pawl 188 is wider than ratchet wheel 186 and, thus, has an extended portion 279. Lever arm 276, which is pivoted to work table 16 at 277, is provided with an upper end 281 for extending under the extended portion 279 of pawl 188. In other words, when the normally deenergized solenoid 270 is energized by actuation of detector mechanism 234 due to an absence of a shell in the pocket of a dial 22 at position E, solenoid operating plunger 274 moves to the left of Figure 10, causing lever arm 276 to rotate in a clockwise direction to a position where its upper end 281 is under the extended portion 279 of pawl 188 when the pawl completes its forward stroke. On the return stroke of the pawl, the upper end 281 of lever arm 276 will cam or lift the pawl clear of the ratchet wheel. This condition will continue until solenoid 270 is deenergized and a spring 283 returns lever arm 276 to its normal disengaged or inoperative position. A more detailed description of the operation of the solenoid 270 and its association with the operation of the entire cap assembly apparatus will follow later in the specification.

Die and punch mechanism

Cooperating with the previously described die plate 266 is the punch mechanism generally indicated by the numeral 30. In more detail, the punch mechanism 30 includes the punch holder 112 which supports a plurality of punches 280, one punch being associated with each aperture 268 in die plate 266. Punches 280, which are four in number, are adapted to be reciprocated up and down by the vertically movable punch holder 112 which, as previously described, is moved by an eccentric 92 mounted on main drive shaft 84.

Punch hold 112 is guided in its vertical movement by punch operating bars 104 riding in the tubular guide elements 102. To further insure accurate vertical movement and alignment of punches 280 with the die plate, a plurality of guide shafts or pins 300 are rigidly supported in the die plate or holder 266 as shown at 302. Shafts 300 extend upwardly from die plate 266 and are received in sleeve bearings 304 supported in punch holder 112.

In order to strip the punched liner from punches 280 and die plate 266, each of the punches 280 is provided with a knock-out rod 282. Each of the knock-out rods 282 is connected together at its upper end by means of a plate 284, the knock-out rods being resiliently urged to an inoperative position by springs (not shown) positioned between the plate and the top of the punch holder 112. A lever arm 286 is pivotally mounted on a bracket 288 which is rigidly supported on and movable with the punch holder 112. Lever arm 286 has one end 290 resting on plate 284, while its other end 296 is adapted to strike a roller 292 journalled on a bracket 294 rigidly fixed to one of the vertical hopper supporting posts 156. Downward movement of punch holder 112 will cause the punches 280 to simultaneously punch out four liners from the strip of lining material 26 when shell-filled pockets of the shell carrying dials 22 are at the position A in Figure 4. Further movement downwardly by punch holder 112 will cause the end 296 of lever arm 286 to strike roller 292, thereby pivoting the same and causing the knock-out rods 282 to move downwardly with respect to punches 280 and thereby knock the liners off the cutting ends of the punches and insert them into the shells.

Cap discharge mechanism and take-off assembly

As previously mentioned, assembled cap discharge mechanism 36 includes a plurality of deflector arms or fingers 230 which extend over top of dials 22 and into the path of assembled caps carried thereby. Deflector arms 230, one of which is associated with each of the dials 22 and connected to shell sliding plate 228 at 298, are adapted to engage the upper edge of an inverted assembled cap at position B of Figure 4 and deflect the cap out of the pocket in the dial 22 as the dial continues its rotation. The deflection of the assembled caps by deflector arms 230 is outwardly in the direction of the arrows F toward the endless conveyors 38 which in turn will transfer the caps from the cap assembling machine to packaging apparatus or the like. While dials 22 are only intermittently rotated in step-by-step movement, the oppositely disposed endless conveyors 38 are continuously rotating. Therefore, caps will be spaced on the take-off conveyors a sufficient distance apart to insure that the caps will not knock one another off of the same. Although in the preferred embodiment of the invention, the take-off conveyors 38 have been disclosed as endless belt type conveyors, it is, of course, within the scope of the present invention to utilize types of endless conveyors such as chain link conveyors or the like.

Electrical control circuits and operation

Referring now specifically to Figure 9, the electrical control circuits for stopping motor unit 40 under certain emergency conditions of operation will now be described. Motor unit 40 is preferably a 3-phase, 440 volt, one horsepower electrical motor. The circuit for controlling the supply of electricity to motor unit 40 includes conductors 344, 346, and 348 having a conventional 3-pole throw switch 330 therein which must be closed prior to operation of motor unit 40. Between throw switch 330 and motor unit 40, a start circuit 332 is provided and includes a conductor 333 connected at one end thereof to conductor 344 and at the other end to one terminal of a start switch 334. The other terminal of start switch 334 is connected to a conductor 335 which has a normally closed stop switch 354 therein, conductor 335 being connected to conductor 346. A relay 336 having a coil in circuit with conductor 335 operates normally open contacts 338, 340, 342, in conductors 344, 346, and 348, respectively, to close the same and supply current to motor unit 40. A holding circuit 352 including a conductor 353 connected to conductor 344 and to the conductor 335 is provided with a normally open contact 350 which is also closed when relay 336 is energized.

To operate motor unit 40, throw switch 330 is closed, and then start switch 334 is closed to energize start circuit 332 and the coil of relay 336. Once the normally opened start switch is closed and relay 336 has been energized to simultaneously close the contacts 338, 340, 342, and 350, electrical current will flow through the holding circuit 352 and maintain the relay 336 energized. Start switch 334 can then be released and the motor unit 40 will continue to operate under normal conditions until the stop switch 354 is opened to break the holding circuit.

As previously mentioned under the section of the specification entitled Shell Carrying Dials, a normally closed micro-switch 262 is positioned adjacent hub 138 of gear 140, the micro-switch 262 being opened by longitudinal movement of gear 140 on shaft 130 caused by jamming of dials 22. Micro-switch 262 is connected in series in holding circuit 352 and, as it is now evident, opening of the micro-switch will break the circuit, causing the coil of relay 336 to be deenergized stopping motor unit 40. A relay 356 including a coil is connected to one phase of the motor voltage between the motor unit and the contacts 338 and 340 by means of conductors 358 and 360. Conductor 358 has four normally closed switches 260 connected in parallel therein. As previously mentioned, switches 260 are individually associated with each of the four shell carrying dials 22 at the position E on work table 16 as disclosed in Figure 4. In more detail, the switches are held in an open position when shells are being continuously carried in normal operation of shell carrying dials 22. However, if a shell is missing from the pocket of any of the dials 22 when it reaches the position E, button 234 will move upwardly causing switch 260 to be closed and the coil of relay 356 to be energized.

A conductor 362 is connected to conductor 360 at 364 and to conductor 358 at 366. In the electrical circuit of conductor 362, a normally opened contact 368 is provided, as well as the solenoid 270, which operates the lever arm 276. Holding circuit 352 is provided with a normally closed contact 370, the contact being open to break the circuit to motor unit 40 by deenergizing the coil of relay 356.

Since normally opened contact 368 and normally closed contact 370 are operated by the coil 356, energizing of relay 356 by closing any of the four switches 260 will cause two conditions to occur in the electrical circuits for the cap assembling machine. First, contact 368 will be closed, energizing the circuit 362 and the solenoid 270 to actuate the lever arm 276 to immediately stop the feeding of lining material by roller 28 from the roll of lining material. Secondly, the movable components of the cap assembly machine such as the shell feeding hoppers 18, the shell carrying dials 22, the punch mechanism 30, and the conveyor belts 38, will be stopped because contact 370 is opened, deenergizing the coil of relay 336 causing contacts 338, 340, and 342 to open and stop motor unit 40. The only time the coil of relay 356 is energized is when one of the switches 260 is closed by the absence of a shell in the pocket of one of the shell carrying dials.

As shown in Figure 4, each of the shell chutes 20 is provided at its discharge end with the nozzle ends of air lines 410. Compressed air if flowed through lines 410 and the air jet therefrom is directed against the shells so as to urge the shells from the chutes into the pockets of dials 22 when the dials stop momentarily. The lines 410 lead from a common manifold 412 having an air valve 414 therein (Figure 9). Air valve 414 controls air to lines 410 and is operated by a solenoid 416 which is connected to one phase of the motor by the conductors 418 and 420. When motor 40 is operating, solenoid 416 is energized and valve 414 is open, permitting air to be discharged from lines 410 against shells in chutes 20. When the machine is normally stopped or is stopped because of one of the emergency conditions mentioned above, solenoid 416 is deenergized, closing valve 414 and cutting off the supply of air to lines 410.

In summation, of the above description of the electrical control circuits, the operation of the cap assembling machine may be briefly described as follows. First, throw switch 330 is closed and then start switch 334 is pressed closed to energize the coil of relay 336 to close contacts 338, 340, 342, and 350. Start switch 334 is held closed until all dials have shells in their pockets to position E (Figure 4) and, thereby, break contact of all four micro-switches 260. Since contact 350 is in the holding circuit 352, also having the relay 336 therein, the relay will remain energized and the motor unit 40 will operate continuously so long as the movable components of the machine operate normally. Should a jam occur in any one of the shell feeding dials causing the same to stop, the overload release mechanism including the gear 140 and the pin 142 on shaft 130 will operate, causing switch 262 in holding circuit 352 to be opened and, thus, deenergizing the coil of relay 336 and stopping motor unit 40. On the other hand, if there is an interruption in feeding of shells from the shell hoppers 18 to the dials 22, the absence of a shell in any of the dials is detected by closing of one of the switches 260. When this occurs, the coil of relay 356 is energized and the lining material feed is immediately stopped by the energizing of solenoid 270. In addition, holding circuit 352 is broken by the contact 370 being opened and motor unit 40 is stopped. By utilizing the solenoid 270 to actuate the lever arm 276 to stop the ratchet feed of lining material, no lining material is wasted due to inertia of the moving parts of the machine after stoppage of the motor unit 40.

The terminology in this specification is for the purpose of description and not limitation, the scope of the invention being defined by the claims.

I claim:

1. In an apparatus for assembling cap liners simultaneously in a plurality of shells to form a plurality of caps: a frame structure including a work table; feeding means operable to cause step by step movement of a strip of lining material over said work table in increments substantially equal to the diameter of a liner; a plurality of pocketed shell carrying dials rotatably mounted on said work table in parallel rows transverse to the path of movement of the lining material over said work table, each of said dials having associated therewith for registry with its respective pockets a shell receiving position and an index position for insertion of a liner into the shell, said shell carrying dials of one of said rows being arranged with respect to the shell carrying dials of the other of said rows so that axes of the pockets of said dials which are in the index positions in one row are in alignment with each other and are spaced apart a distance less than the sum of the diameters of two shells and so that the axes of the pockets of said dials which are in the index positions in adjacent rows are staggered and spaced apart less than the sum of the diameters of two shells; means associated with each of said shell carrying dials for successively feeding shells to the pockets of said dials as their pockets come in registry with the shell receiving positions; means to rotate said shell carrying dials simultaneously in step by step increments and successively transfer shell filled pockets to said index positions; means operable when said dials are at rest and when said strip of lining material is stationary for punching out and inserting liners from said strip simultaneously into the shells of shell filled pockets in registry with said index positions of the dials so as to form a plurality of caps simultaneously, said last mentioned means punching rows of liners longitudinally of the strip, adjacent rows being staggered with respect to each other whereby a maximum amount of the strip of lining material is utilized for liners and a minimum amount of waste results; and means to remove assembled caps from said shell carrying dials.

2. An apparatus of the character described in claim 1 including an electrical control circuit for operating said means to rotate said shell carrying dials and said means for feeding shells to pockets of said dials, a normally closed contact in said circuit, a second electrical circuit having a coil therein, said coil when energized opening said contact, and detector means associated with the pockets of each of said dials forward of a point of assembly of a cap to indicate absence of a shell, said detector means associated with each of said dials including a switch associated with each of said dials and cooperating with the respective pockets of said dials, said switches being connected in parallel in said second circuit and normally open when the pockets of said dials contain a cap shell, one of said switches being closed in the absence of a cap shell in a pocket of said dials to energize said second electrical control circuit and its coil to open said contact and deenergize said first electrical control circuit to cause said shell carrying dials, said shell feeding means and said feeding means for said lining material to cease operation.

3. An apparatus of the character described in claim 1 wherein said means for punching out and inserting liners into the shells includes a punch and die associated with the index position of each of said dials, the punches and dies associated with the index positions of the dials in one row being staggered with respect to the punches and dies associated with the index positions of the dials in the other row.

4. An apparatus of the character described in claim 1 including a pair of endless conveyors positioned on the top of said worktable on opposite sides of and parallel to said rows of dials, said pair of endless conveyors receiving assembled caps from said rows of dials respectively.

5. In an apparatus for assembling cap liners simultaneously in a plurality of shells to form a plurality of caps: a frame structure including a work table; feeding means operable to cause step by step movement of a strip of lining material over said work table in increments substantially equal to the diameter of a liner; a plurality of pocketed shell carrying dials rotatably mounted on said work table in parallel rows transverse to the path of movement of the lining material over said work table, each of said dials having associated therewith for registry with its respective pockets a shell receiving position and an index position for insertion of a liner into the shell, said shell carrying dials of one of said rows being arranged with respect to the shell carrying dials of the other of said rows so that axes of the pockets of said dials which are in the index positions in one row are in alignment with each other and are spaced apart a distance less than the sum of the diameters of two shells and so that the axes of pockets of said dials which are in the index positions in adjacent rows are staggered and spaced apart less than the sum of the diameters of two shells; means associated with each of said shell carrying dials for successively feeding shells to the pockets of said dials as their pockets come in registry with the shell receiving positions; means to rotate said shell carrying dials simultaneously in step by step increments and successively transfer shell filled pockets to said index positions; means operable when said dials are at rest and when said strip of lining material is stationary for punching out and inserting liners from said strip simultaneously into the shells of shell filled pockets in registry with said index positions of the dials so as to form a plurality of caps simultaneously, said last mentioned means punching rows of liners longitudinally of the strip, adjacent rows being staggered with respect to each other whereby a maximum amount of the strip of lining material is utilized for liners and a minimum amount of waste results; means to retain shells in the pockets of said dials when said dials are rotated; and means to remove the assembled caps from said shell carrying dials.

6. In an apparatus for assembling cap liners simultaneously in a plurality of shells to form a plurality of caps: a frame structure including a work table; feeding means operable to cause step by step movement of a strip of lining material over said work table in increments substantially equal to the diameter of a liner; a plurality of pocketed shell carrying dials rotatably mounted on said work table in parallel rows transverse to the path of movement of the lining material over said work table, each of said dials having associated therewith for registry with its respective pockets a shell receiving position and an index position for insertion of a liner into the shell, said shell carrying dials of one of said rows being arranged with respect to the shell carrying dials of the other of said rows so that axes of the pockets of said dials which are in the index positions in one row are in alignment with each other and are spaced apart a distance less than the sum of the diameters of two shells and so that the axes of pockets of said dials which are in the index positions in adjacent rows are staggered and spaced apart less than the sum of the diameters of two shells; means associated with each of said shell carrying dials for successively feeding shells to the pockets of said dials as their pockets come in registry with the shell receiving positions; means to rotate said shell carrying dials simultaneously in step by step increments and successively transfer shell filled pockets to said index positions said means to rotate said shell carrying dials comprising a source of power including a motor unit, an intermittent drive unit operatively connected to said motor unit, a driven shaft intermittently rotated by said intermittent drive unit, a drive gear mounted on said driven shaft, a second gear meshing with said drive gear, a gear train associated with said dials to rotate the same simultaneously, said gear train adapted to be rotated by said second gear; means providing an overload release between said driven and said drive gear and operable upon jamming of any of said dials, means operable when said dials are at rest and when said strip of lining material is stationary for punching out and inserting liners from said strip simultaneously into the shells of shell filled pockets in registry with said index positions of the dials so as to form a plurality of caps simultaneously, said last mentioned means punching rows of liners longitudinally of the strip, adjacent rows being staggered with respect to each other whereby a maximum amount of the strip of lining material is utilized for liners and a minimum amount of waste results; means operable by said overload release device to stop said motor unit and said means for feeding shells to the pockets of said dials and said means to insert liners into the shell filled pockets of said dials, detector means associated with each of said shell carrying dials, said detector means being operative by the absence of a shell in any of the pockets of said shell carrying dials to stop said motor unit; and means to remove the assembled caps from said shell carrying dials.

7. An apparatus of the character described in claim 6 wherein said overload release device includes a pin element rigidly mounted on said driven shaft, said drive gear having a hub with a recess thereon for engaging said pin element, and resilient means normally urging said drive gear toward said pin element so the hub of said drive gear is in normal driving engagement with said pin element, and wherein said motor unit is provided with an electrical control circuit, said electrical control circuit being normally energized to operate said motor unit, a normally closed switch in said electrical circuit, said switch being operable to an open position by said overload release device whereby said circuit is deenergized and said motor unit is stopped.

8. In an apparatus for assembling a cap liner simultaneously into each of a plurality of shells to form a plurality of caps, a frame structure including a work table, a motor unit, a plurality of pocketed shell carrying dials mounted on said table, said shell carrying dials being simultaneously and intermittently rotated by said motor unit, hopper means positioned above said table and having a plurality of chutes extending vertically downwardly therefrom and terminating horizontally adjacent each of said shell carrying dials, said hopper means being driven by said motor unit to continuously supply shells to the pockets of said shell carrying dials, a die element positioned above said shell carrying dials and having a die opening therein for each of said shell carrying dials, said die openings being positioned to cooperate with a shell-filled pocket of each of said shell carrying dials, a feed roller supported on said frame structure and adapted to feed a strip of lining material over said dial elements, means operatively connecting said feed roller to said motor unit for intermittently feeding the lining material over said dial elements, a punch unit driven by said motor unit, said punch unit having punching elements cooperating with the die opennigs of each of said dial units and being adapted to punch a liner out of said lining material and insert the same into the shells carried by said shell carrying elements, means associated with each of said shell carrying dials forward of a position where liners are inserted into shells for detecting the absence of a shell in any of said shell carrying dials, said last-mentioned means being operable upon the absence of a shell in a pocket of said shell carrying dials to stop said motor unit, and means operable upon jamming of any of said dials to stop said motor unit an electrical control circuit for operating said motor unit, said electrical control circuit having a normally closed contact therein, a second electrical control circuit having a coil therein, said coil when energized opening said contact to stop said motor unit, said means associated with each of said shell carrying dials for detecting the absence of a shell in the pockets thereof including a plurality of switches associated individually with each of said dials and connected in parallel in said second electrical control circuit, said switches being open when said dials are carrying shells, any of said plurality of switches being closed by the absence of a shell in any of said dials and energizing said second electrical control circuit and its coil to open said contact to stop said motor unit.

9. A device of the character described in claim 8 wherein said means to stop said motor unit upon jamming of any of said dials includes a normally closed switch in said first electrical control circuit, said switch being opened by the jamming of a dial to deenergize said first electrical control circuit to stop said motor unit.

10. In an apparatus for assembling a cap liner simultaneously into each of a plurality of shells to form a plurality of caps, a frame structure including a work table, a motor unit, a plurality of pocketed shell carrying dials mounted on said table, said shell carrying dials being simultaneously and intermittently rotated by said motor unit, hopper means positioned above said table and having a plurality of chutes extending vertically downwardly therefrom and terminating horizontally adjacent each of said shell carrying dials, said hopper means being driven by said motor unit to continuously supply shells to the pockets of said shell carrying dials, a die element positioned above said shell carrying dials and having a die opening therein for each of said shell carrying dials, said die openings being positioned to cooperate with a shell-filled pocket of each of said shell carrying dials, a feed roller supported on said frame structure and adapted to feed a strip of lining material over said dial elements, means operatively connecting said feed roller to said motor unit for intermittently feeding the lining material over said dial elements, said means connecting said feed roller to said motor unit for intermittently driving the same including a ratchet mechanism having a ratchet wheel mounted on said roller and a pawl driven by said motor unit for engaging said ratchet wheel, a punch unit driven by said motor unit, said punch unit having punching elements cooperating with the die openings of each of said dial units and being adapted to punch a liner out of said strip of lining material and insert the same into the shells carried by said shell carrying elements, means associated with each of said shell carrying dials forward of a position where liners are inserted into shells for detecting the absence of a shell in any of said shell carrying dials, said last mentioned means being operable upon the absence of a shell in a pocket of said shell carrying dials to stop said motor unit, and means operable upon jamming of any of said dials to stop said motor unit, an electrical control circuit for operating said motor unit, said electrical control circuit having a normally closed contact therein, a second electrical control circuit having a coil therein, said coil when energized opening said contact and deenergizing said first electrical control circuit to stop said motor unit, said second electrical control circuit being normally deenergized, said means for detecting the absence of a shell in the pockets of any of said dials including a plurality of switches connected in parallel in said second electrical control circuit and individual to each of said shell carrying dials, said switches in said second electrical circuit being open when said dials carry shells, a third electrical control circuit, said third electrical control circuit having a solenoid therein with a trip lever adapted to disengage said pawl from said ratchet wheel when said solenoid is energized, said third electrical control circuit also having a normally open contact therein, any of said switches of said second electrical control circuit being closed by the absence of a shell in any of said dials to energize said second electrical circuit and its coil to open the contacts in said first electrical control circuit deenergizing the same and stopping the motor unit while closing the contact in said third electrical control circuit to energize the same causing said solenoid to operate and its trip lever to disengage said pawl and stop feeding of said strip of lining material.

References Cited in the file of this patent

UNITED STATES PATENTS

| | | |
|---|---|---|
| 234,690 | Schneller | Nov. 23, 1880 |
| 1,005,622 | Eisenbeis | Oct. 10, 1911 |
| 1,447,381 | Graham | Mar. 6, 1923 |
| 1,768,605 | Johnson | July 1, 1930 |
| 1,908,898 | Johnson | May 16, 1933 |
| 2,017,124 | Johnson | Oct. 15, 1935 |
| 2,537,832 | Johnson | Jan. 9, 1951 |
| 2,567,141 | Andrew | Sept. 4, 1951 |
| 2,703,130 | Wilckens et al. | Mar. 1, 1955 |
| 2,714,810 | Zaiger | Aug. 9, 1955 |